United States Patent
Sano

(10) Patent No.: US 11,241,959 B2
(45) Date of Patent: Feb. 8, 2022

(54) RESIN MOLDED PRODUCT AND VEHICLE DISPLAY DEVICE

(71) Applicant: Yazaki Corporation, Tokyo (JP)

(72) Inventor: Teruomi Sano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 134 days.

(21) Appl. No.: 15/412,599

(22) Filed: Jan. 23, 2017

(65) Prior Publication Data

US 2017/0129337 A1 May 11, 2017

Related U.S. Application Data

(63) Continuation of application No. PCT/JP2015/072572, filed on Aug. 7, 2015.

(30) Foreign Application Priority Data

Aug. 25, 2014 (JP) .............................. JP2014-170309

(51) Int. Cl.
*G02B 5/02* (2006.01)
*B60K 35/00* (2006.01)
(Continued)

(52) U.S. Cl.
CPC .............. *B60K 35/00* (2013.01); *B29C 33/42* (2013.01); *B29C 37/0053* (2013.01);
(Continued)

(58) Field of Classification Search
None
See application file for complete search history.

(56) References Cited

U.S. PATENT DOCUMENTS 5,997,161 A * 12/1999 Stringfellow .......... B60K 37/02
362/489
2002/0102387 A1 8/2002 Sumi et al.
(Continued)

FOREIGN PATENT DOCUMENTS

DE  11 2012 001 024 T5  12/2013
JP       05-138736 A     6/1993
(Continued)

OTHER PUBLICATIONS

International Search Report for application No. PCT/JP2015/072572 dated Oct. 13, 2015.
(Continued)

*Primary Examiner* — Christopher Stanford
*Assistant Examiner* — Journey F Sumlar
(74) *Attorney, Agent, or Firm* — Sughrue Mion, PLLC

(57) ABSTRACT

A resin molded product that is applied to a vehicle display device has a surface on which a plurality of fine irregularities having surface roughness of equal to or larger than 1.0 μm and equal to or smaller than 10.0 μm and an array pitch of equal to or larger than 3.0 μm and equal to or smaller than 18.0 μm are molded. In other words, the resin molded product has the surface on which the fine irregularities causing a gloss value at an incident angle of 85° to be equal to or lower than 2 are molded. This configuration provides an effect that the resin molded product and the vehicle display device can lower gloss of the surface.

4 Claims, 10 Drawing Sheets

(51) Int. Cl.
   *B29C 33/42* (2006.01)
   *B29C 37/00* (2006.01)
   *B29L 31/30* (2006.01)
(52) U.S. Cl.
   CPC ......... *G02B 5/0221* (2013.01); *G02B 5/0278* (2013.01); *B29C 33/424* (2013.01); *B29K 2995/0072* (2013.01); *B29L 2031/3008* (2013.01); *B60K 2370/39* (2019.05)

(56) References Cited

U.S. PATENT DOCUMENTS

| | | | |
|---|---|---|---|
| 2009/0205560 A1* | 8/2009 | Behrends | B60K 37/02 116/334 |
| 2012/0188484 A1* | 7/2012 | Yaguchi | G02B 6/0081 349/62 |
| 2013/0141792 A1 | 6/2013 | Ueda et al. | |
| 2016/0142689 A1* | 5/2016 | Karikomi | H04N 9/3155 348/745 |

FOREIGN PATENT DOCUMENTS

| | | |
|---|---|---|
| JP | 07-144363 A | 6/1995 |
| JP | 2000-15687 A | 1/2000 |
| JP | 2000-52411 A | 2/2000 |
| JP | 2006-068972 A | 3/2006 |
| JP | 2010-208318 A | 9/2010 |
| JP | 2011-189697 A | 9/2011 |
| JP | 2014-000770 A | 1/2014 |

OTHER PUBLICATIONS

Communication dated Dec. 5, 2017 from the Japanese Patent Office in counterpart Japanese application No. 2016-545421.
Communication dated Feb. 1, 2018 issued by the German Patent Office in counterpart application No. 11 2015 003 894.9.

* cited by examiner

RESIN MOLDED PRODUCT AND VEHICLE DISPLAY DEVICE

CROSS-REFERENCE TO RELATED APPLICATION

This application is a continuation application of International Application PCT/JP2015/072572, filed on Aug. 7, 2015, which claims priority to Japanese Patent Application No. 2014-170309, filed Aug. 25, 2014, and designating the U.S., the entire contents of which are incorporated herein by reference.

BACKGROUND OF THE INVENTION

1. Field of the Invention

The present invention relates to a resin molded product and a vehicle display device.

2. Description of the Related Art

As a resin molded product that is applied to vehicles and the like, for example, Japanese Patent Application Laid-open No. 2011-189697 discloses a resin molded product that has embosses molded on a surface and is applied to a bumper and the like as automobile exterior components. The resin molded product has the embosses the depth of which is set to be equal to or larger than 3 μm and equal to or smaller than 5 μm, the pitch of which is set to be equal to or larger than 550 μm and equal to or smaller than 750 μm, and 60°-gloss of the emboss surface of which is set to be equal to or higher than 28 and equal to or lower than 35. With this configuration, the resin molded product having scratch resistance that is not lowered even without coating and appearance quality that is not lowered even with coating is tried to be provided.

The above-mentioned resin molded product is applied to, for example, a vehicle display device that is mounted on a vehicle in some cases. In such a case, gloss of a surface in a region that can come into the visual fields of passengers and the like is lowered to achieve high-grade feeling in appearance in some cases, for example. In this case, in the resin molded product, the gloss of the surface is expected to be lowered without coating using no coating or the like in order to, for example, reduce worker-hours at the time of manufacturing.

SUMMARY OF THE INVENTION

The present invention has been made in view of the above-mentioned circumstances and an object thereof is to provide a resin molded product and a vehicle display device that can lower gloss of a surface.

In order to achieve the above mentioned object, a resin molded product applied to a vehicle display device mounted on a vehicle according to one aspect of the present invention includes a surface of the resin molded product on which a plurality of fine irregularities are molded, the fine irregularities having surface roughness of equal to or larger than 1.0 μm and equal to or smaller than 10.0 μm and an array pitch of equal to or larger than 3.0 μm and equal to or smaller than 18.0 μm.

According to another aspect of the present invention, in the resin molded product, it is possible to configure that the fine irregularities have the surface roughness of equal to or larger than 1.3 μm and equal to or smaller than 10.0 μm and the array pitch of equal to or larger than 3.0 μm and equal to or smaller than 13.5 μm.

In order to achieve the above mentioned object, a vehicle display device according to still another aspect of the present invention includes a display unit that is mounted on a vehicle and displays information relating to the vehicle; and a resin molded product that is provided around the display unit and has a surface on which a plurality of fine irregularities are molded, the fine irregularities having surface roughness of equal to or larger than 1.0 μm and equal to or smaller than 10.0 μm and an array pitch of equal to or larger than 3.0 μm and equal to or smaller than 18.0 μm.

In order to achieve the above mentioned object, a vehicle display device according to still another aspect of the present invention includes a display unit that is mounted on a vehicle and displays information relating to the vehicle; and a resin molded product that is located between a light source part included in the display unit and a viewing position, is provided on a standing face projecting along an alignment direction of the light source part and the viewing position, and has a surface on which a plurality of fine irregularities causing a gloss value at an incident angle of 85° to be equal to or lower than 2 are molded.

According to still another aspect of the present invention, in the vehicle display device, it is possible to configure that the fine irregularities have surface roughness of equal to or larger than 1.0 μm and equal to or smaller than 10.0 μm and an array pitch of equal to or larger than 3.0 μm and equal to or smaller than 18.0 μm, or have the surface roughness of equal to or larger than 1.15 μm and equal to or smaller than 10.00 μm, or have the array pitch of equal to or larger than 3.0 μm and equal to or smaller than 14.0 μm.

According to still another aspect of the present invention, in the vehicle display device, it is possible to configure that the fine irregularities have the surface roughness of equal to or larger than 1.4 μm and equal to or smaller than 3.0 μm and the array pitch of equal to or larger than 4.0 μm and equal to or smaller than 13.0 μm.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. It should be noted that the embodiment does not limit the present invention. Components in the following embodiment include components by which those skilled in the art can easily replace and substantially the same components.

Embodiment

Figure 1:
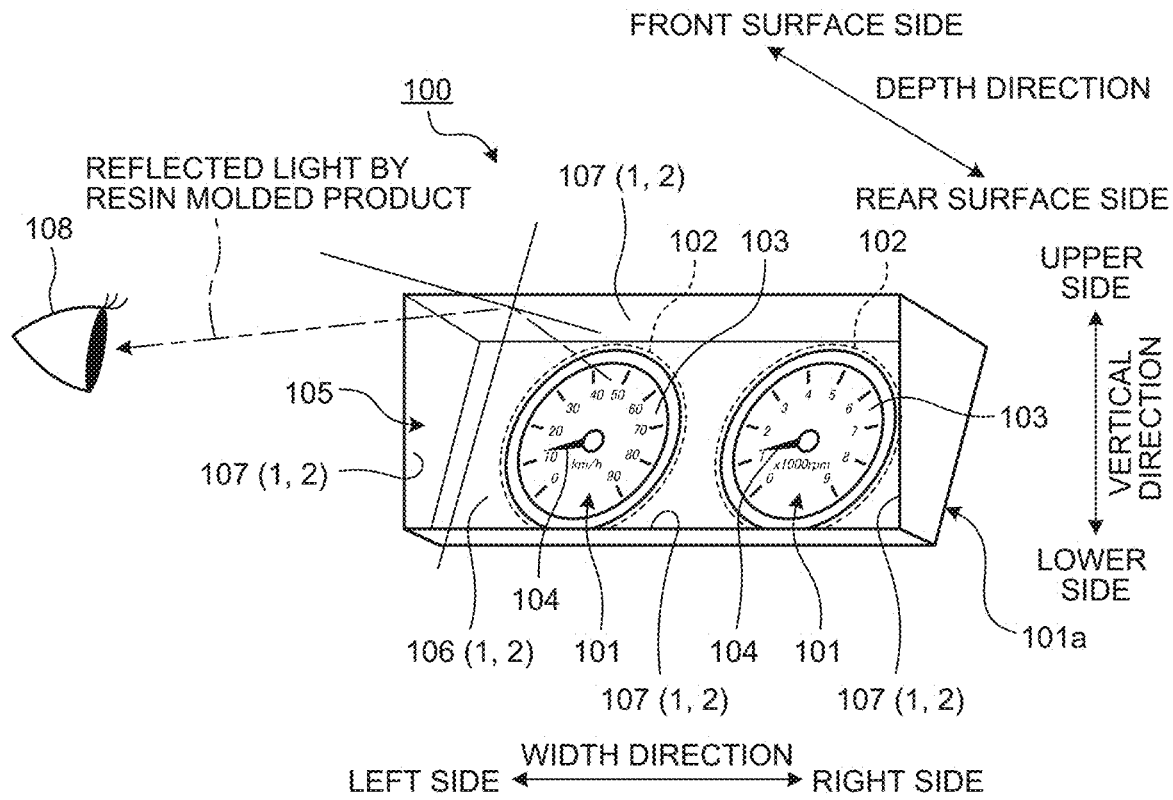
FIG. 1 is a perspective view illustrating the schematic configuration of a vehicle display device to which a resin molded product according to an embodiment is applied.
Figure 2:
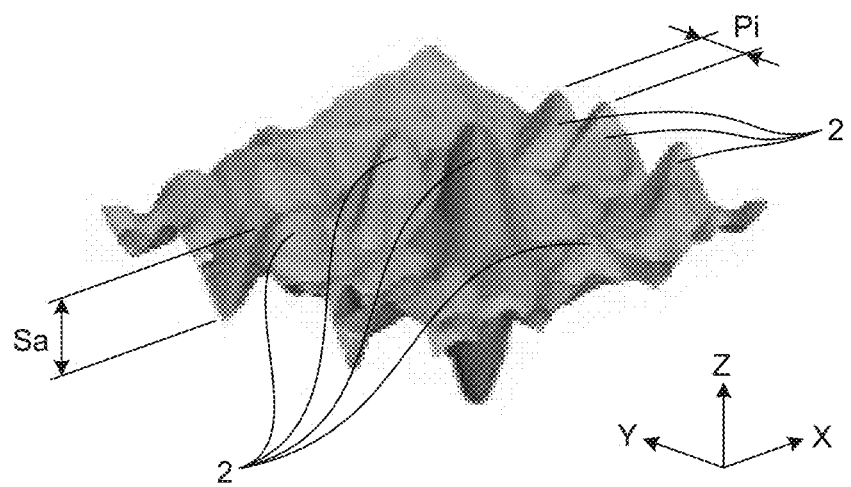
FIG. 2 is a schematic perspective view for explaining surface roughness and an array pitch of fine irregularities in the resin molded product in the embodiment.
Figure 3:
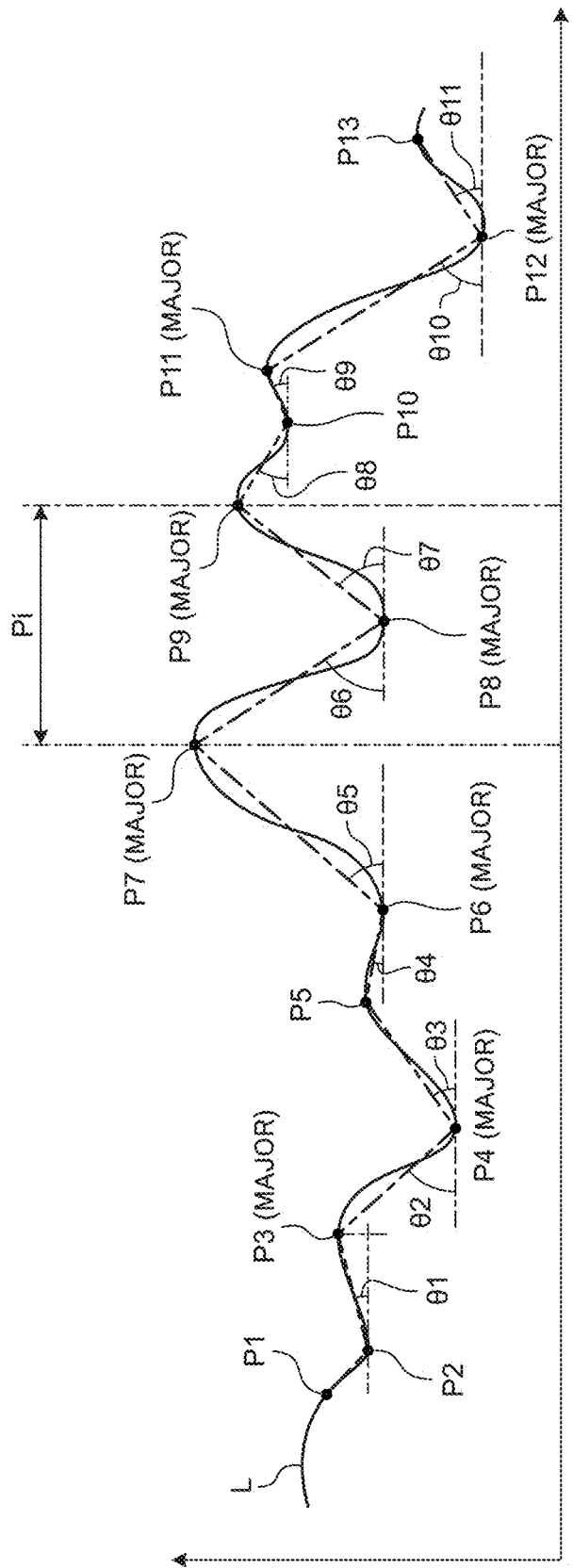
FIG. 3 is a schematic view for explaining measurement of the array pitch in the resin molded product in the embodiment.
Figure 4:
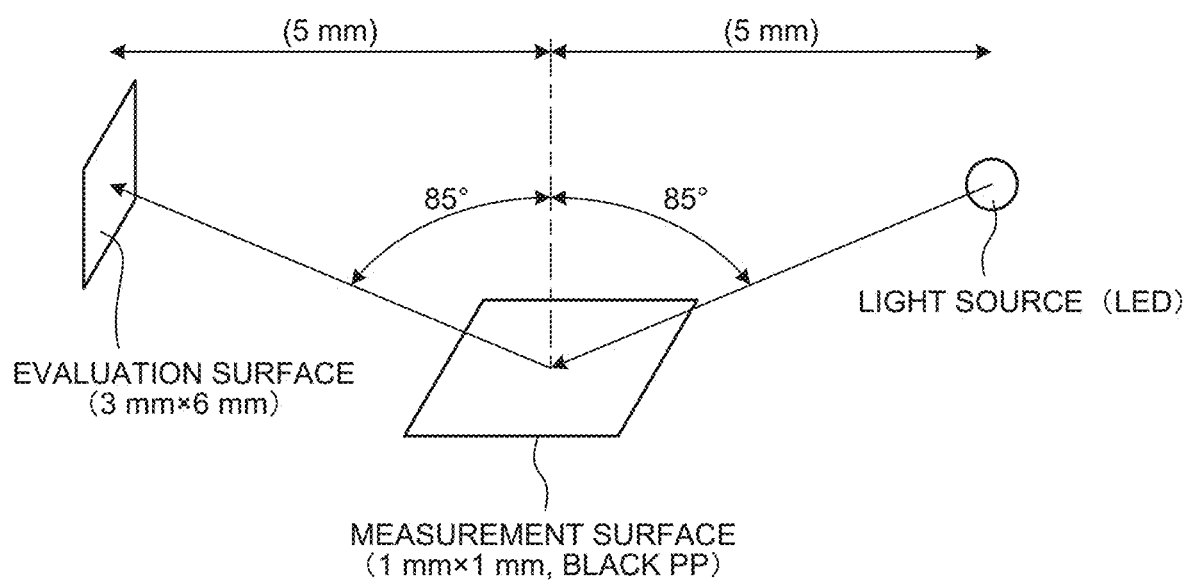
FIG. 4 is a schematic view for explaining an 85°-gloss value in the resin molded product in the embodiment.
Figure 5:
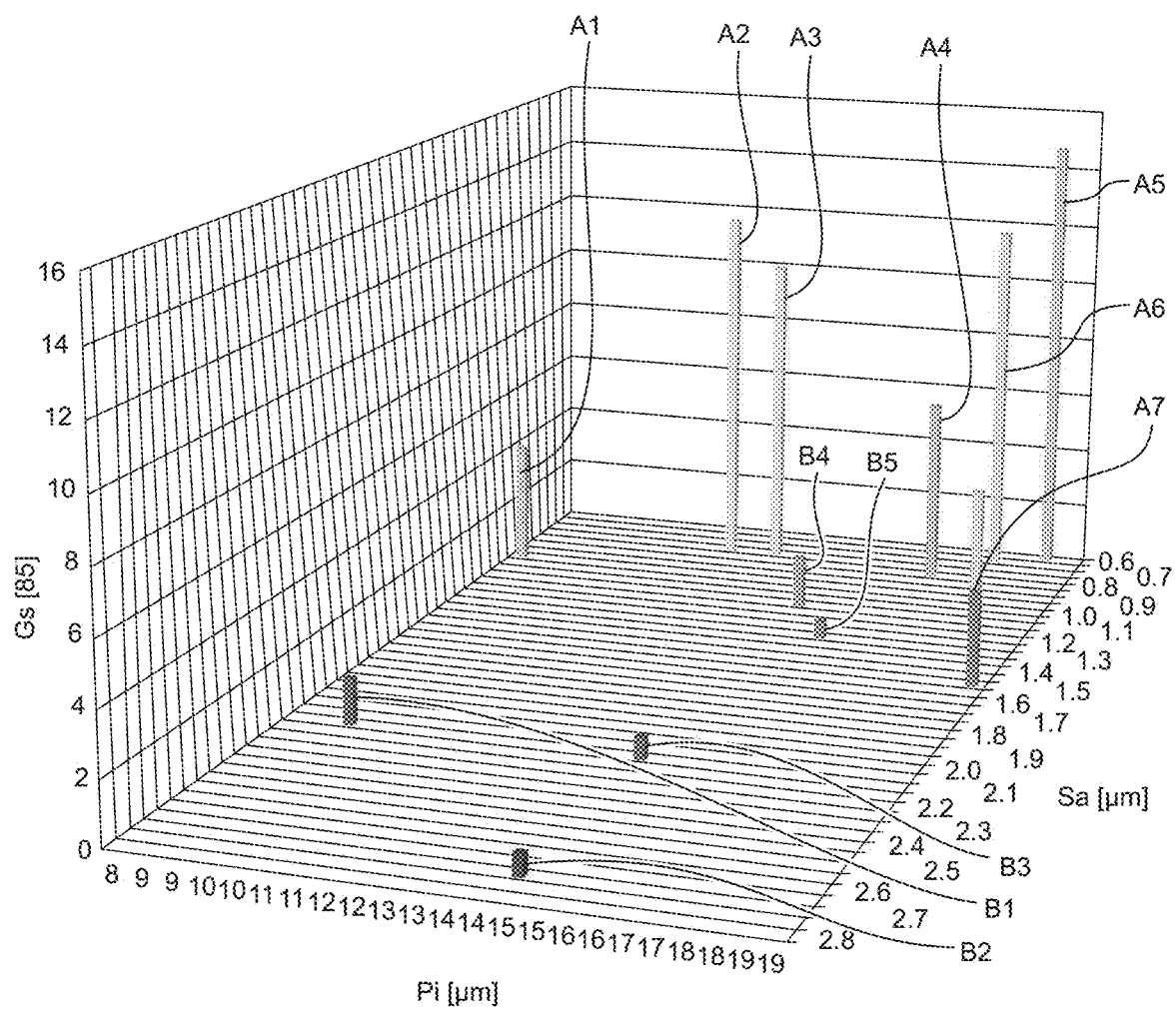
FIG. 5 is a diagram representing measurement results of influence by the surface roughness and the array pitch of the fine irregularities on the 85°-gloss value.
Figure 6:
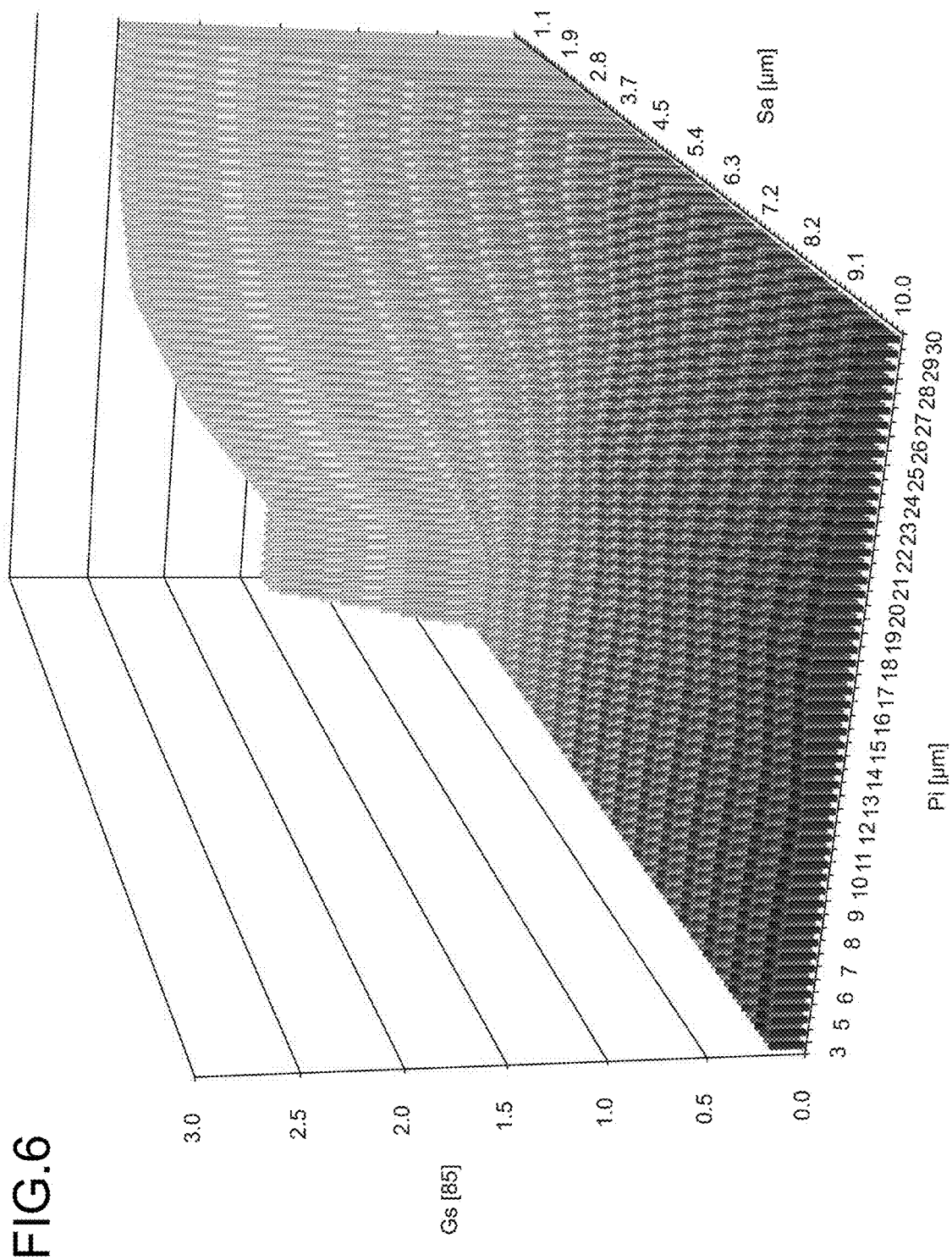
FIG. 6 is a diagram representing a first simulation result of the influence by the surface roughness and the array pitch of the fine irregularities on the 85°-gloss value.
Figure 7:
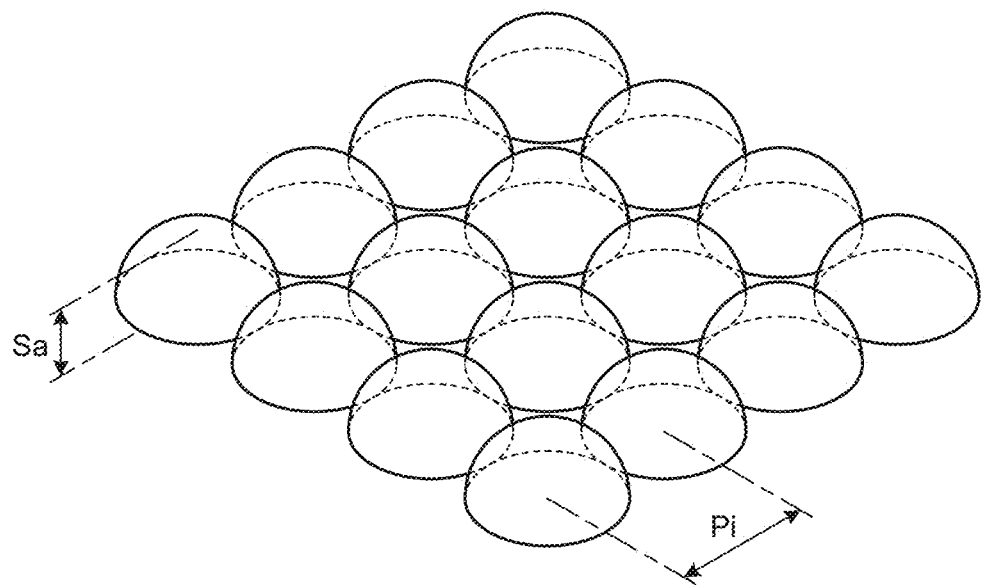
FIG. 7 is a schematic view for explaining a first simulation condition.
Figure 8:
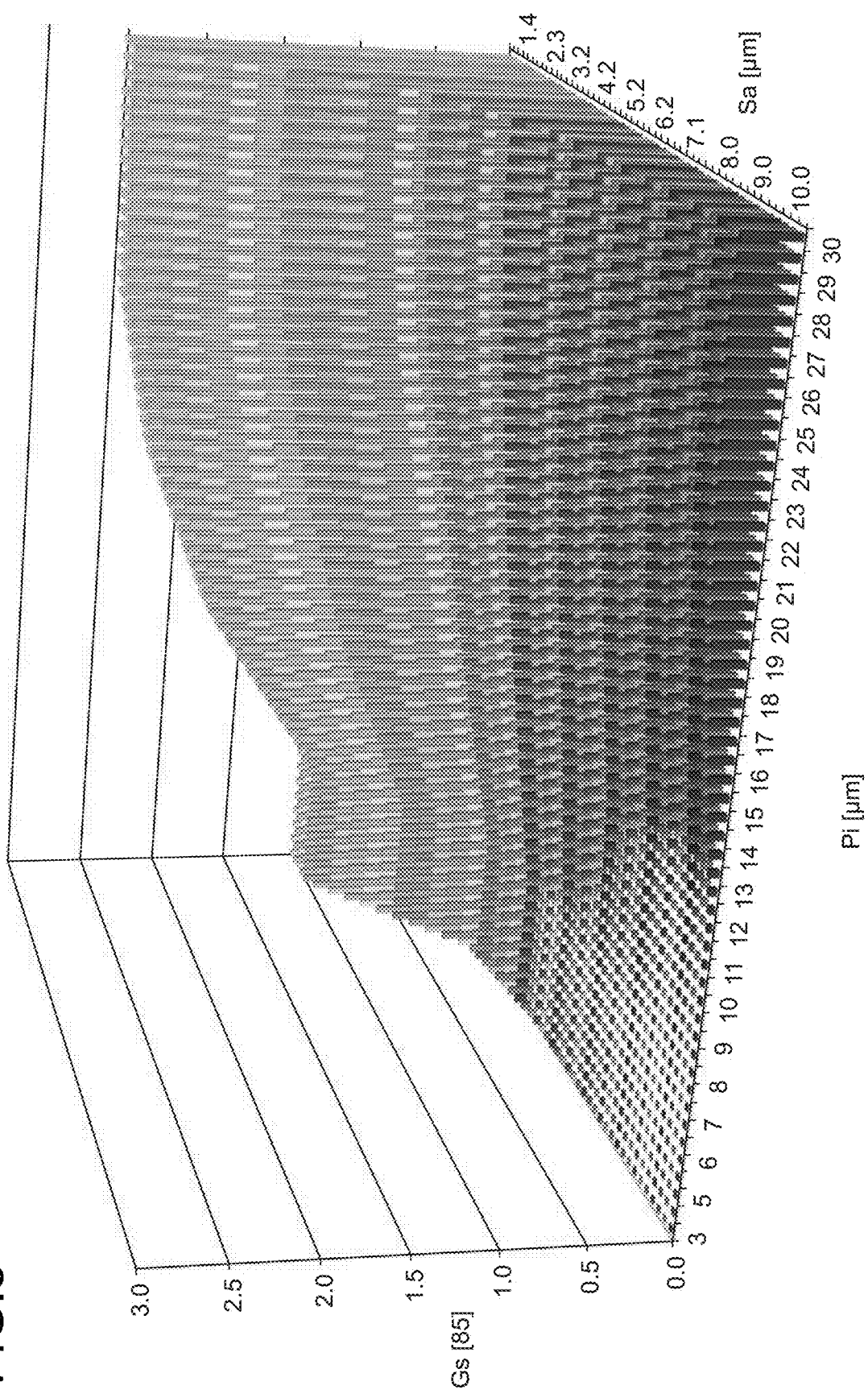
FIG. 8 is a diagram representing a second simulation result of the influence by the surface roughness and the array pitch of the fine irregularities on the 85°-gloss value.
Figure 9:
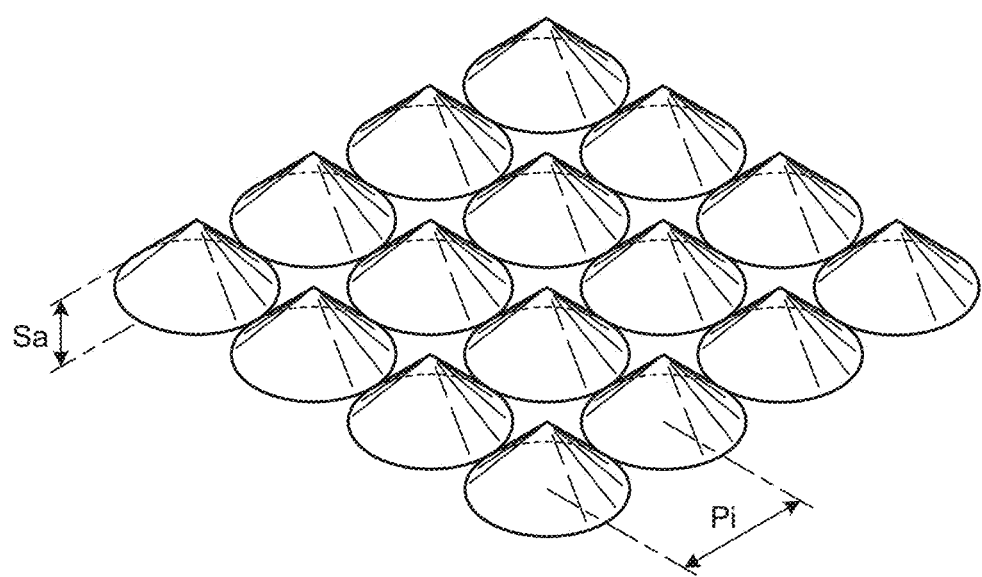
FIG. 9 is a schematic view for explaining a second simulation condition.
Figure 10:
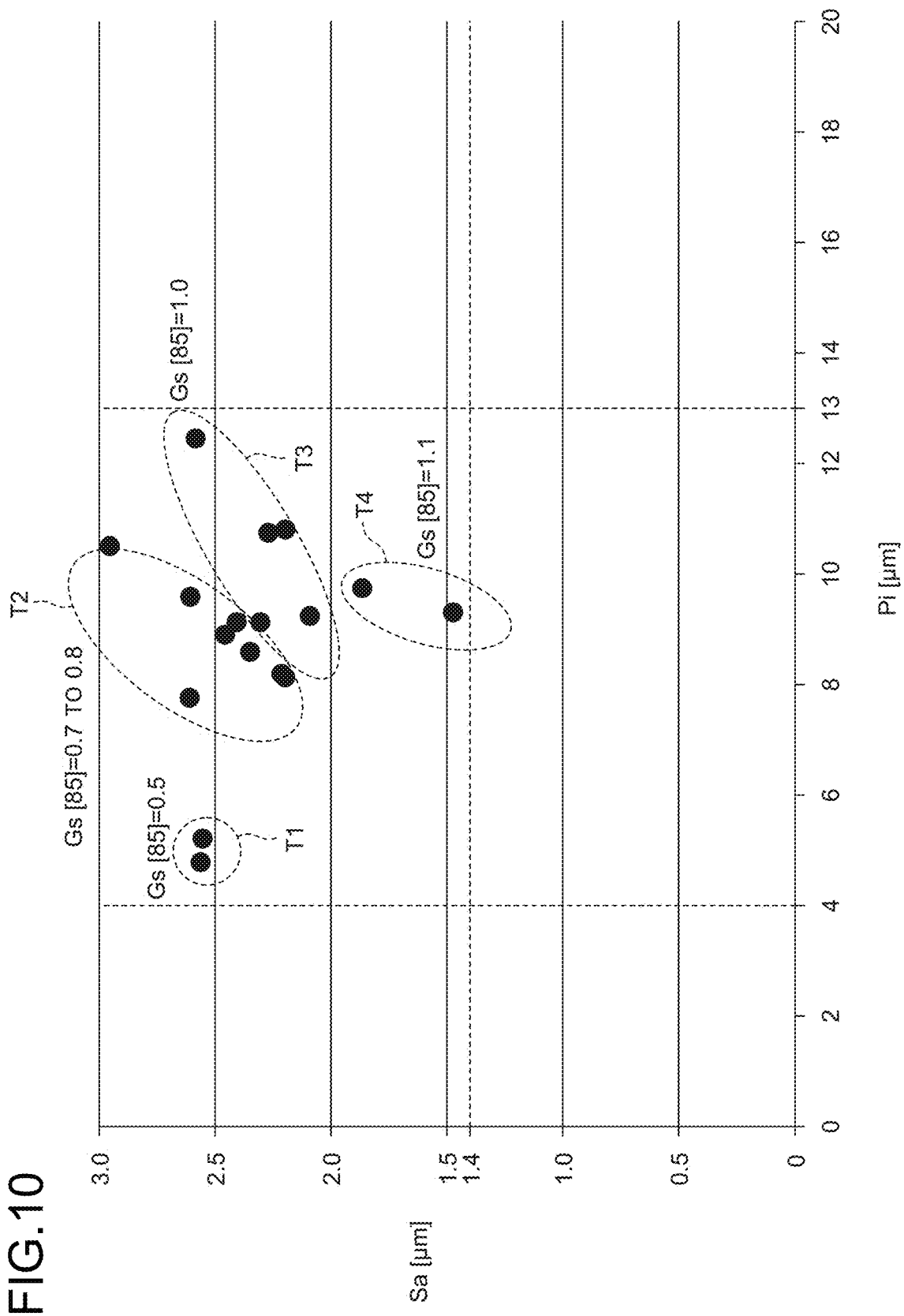
FIG. 10 is a diagram representing measurement results of the influence by the surface roughness and the array pitch of the fine irregularities on the 85°-gloss value in the resin molded product without coating.
Figure 11:
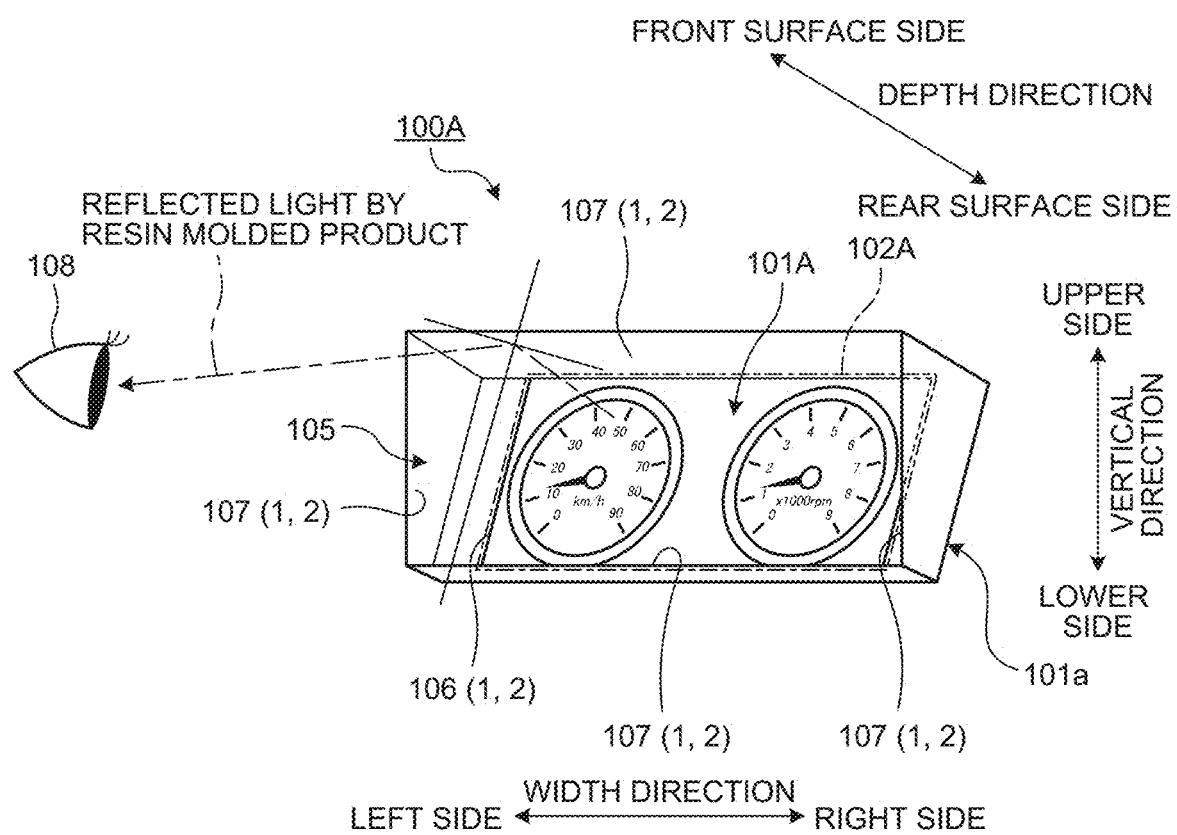
FIG. 11 is a perspective view illustrating the schematic configuration of a vehicle display device to which a resin molded product according to a modification is applied.

FIG. 1 is a perspective view illustrating the schematic configuration of a vehicle display device to which a resin molded product according to an embodiment is applied. FIG. 2 is a schematic perspective view for explaining surface roughness and an array pitch of fine irregularities in the resin molded product in the embodiment. FIG. 3 is a schematic view for explaining measurement of the array pitch in the resin molded product in the embodiment. FIG. 4 is a schematic view for explaining an 85°-gloss value in the resin molded product in the embodiment. FIG. 5 is a diagram representing measurement results of influence by the surface roughness and the array pitch of the fine irregularities on the 85°-gloss value. FIG. 6 is a diagram representing a first simulation result of the influence by the surface roughness and the array pitch of the fine irregularities on the 85°-gloss value. FIG. 7 is a schematic view for explaining a first simulation condition. FIG. 8 is a diagram representing a second simulation result of the influence by the surface roughness and the array pitch of the fine irregularities on the 85°-gloss value. FIG. 9 is a schematic view for explaining a second simulation condition. FIG. 10 is a diagram representing measurement results of the influence by the surface roughness and the array pitch of the fine irregularities on the 85°-gloss value in the resin molded product without coating. FIG. 11 is a perspective view illustrating the schematic configuration of a vehicle display device to which a resin molded product according to a modification is applied.

A resin molded product 1 in the embodiment is applied to a vehicle display device 100 that is mounted on a vehicle, as illustrated in FIG. 1. The vehicle display device 100 in the embodiment configures a what-is-called on-vehicle meter, is mounted on, for example, an instrument panel provided on a dashboard of the vehicle, and displays various pieces of information related to the vehicle as pieces of information provided for driving of the vehicle. The vehicle display device 100 includes display units 101 that are mounted on the vehicle and display the pieces of information related to the vehicle and a resin molded product 1 that is provided around the display units 101. The vehicle display device 100 has the configuration in which a plurality of fine irregularities 2 (see FIG. 2 and the like) are molded on the surface of the resin molded product 1, thereby lowering gloss of the surface.

The width direction of the vehicle display device 100 illustrated in FIG. 1 typically corresponds to the vehicle width direction of the vehicle to which the vehicle display device 100 is applied. In the following description, in the width direction of the vehicle display device 100, the left side (left side in FIG. 1) when viewed from the front surface side of the vehicle display device 100 is referred to as a widthwise left side in some cases and the right side (right side in FIG. 1) when viewed from the front surface side thereof is referred to as a widthwise right side in some cases. The depth direction of the vehicle display device 100 illustrated in FIG. 1 typically corresponds to the front-rear direction of the vehicle to which the vehicle display device 100 is applied. The front surface side of the vehicle display device 100 corresponds to the side facing a driver's seat of the vehicle and typically corresponds to the side that is viewed from the driver sitting on the driver's seat. A viewing position 108, which will be described later, is located at the front surface side of the vehicle display device 100 in the depth direction. On the other hand, the rear surface side of the vehicle display device 100 corresponds to the side opposite to the front surface side in the depth direction and typically corresponds to the side that is accommodated in the instrument panel.

The display units 101 include light source parts 102 and display various pieces of information related to the vehicle using light emitted from the light source parts 102. The display units 101 display various pieces of information that are provided for the driving of the vehicle, such as a vehicle speed, an output rotating speed of a driving power source for traveling, a cumulative travel distance, warning display (what-is-called telltale), and a shift position indicator, as the various pieces of information related to the vehicle. The two display units 101 are provided at an interval along the width direction, as an example, and each of them is configured by including the light source part 102, a dial plate 103, and a pointer 104. The two display units 101 are analog instruments displaying various measured values related to the vehicle in an analog manner with the pointers 104. The light source parts 102 are arranged at the rear surface side of the dial plates 103 in the depth direction. On the dial plates 103, for example, index portions that indicate the measured values of the speed, the output rotating speed, and the like and are pointed by the pointers 104 and patterns or the like for the warning display are drawn as the pieces of information related to the vehicle. The dial plates 103 are formed by, for example, a transparent polycarbonate sheet, and printing of outlined shapes corresponding to the above-mentioned index portions and the patterns or the like for the warning display is applied on the dial plates 103 with dark-colored inks. The light source parts 102 are configured by including light source main bodies such as light emitting diode (LED) elements and diffusing plates diffusing light emitted from the light source main bodies to the sides of the dial plates 103. The respective display units 101 are made into states of displaying the index portions and the patterns or the like for the warning display when the light emitted from the light source parts 102 passes through the portions on which the index portions and the patterns or the like for the warning display are cut out on the dial plates 103. The index portions that are pointed by the pointers 104 are configured by including circular arcs along rotational movement trajectories of the front ends of the pointers 104, a plurality of scales marked at a constant interval along the circular arcs, and numbers. The pointers 104 are located at the front surface side of the dial plates 103 in the depth direction, are rotationally moved when motors provided in a housing 101a configuring the vehicle display device 100 are driven, and point out predetermined positions on the index portions in accordance with the various measured values (speed, output rotating speed, and the like) related to the vehicle. On the respective display units 101, the pointers 104 point out the current speed and the current output rotating speed. It is sufficient that the display units 101 have the light source parts 102 and display the various pieces of information related to the vehicle by the light source parts 102. The display units 101 may be configured by, for example, liquid crystal display devices.

The resin molded product 1 is provided around the display units 101. The resin molded product 1 in the embodiment is applied to a facing plate 105 of the vehicle display device 100. The facing plate 105 is a frame-like member that is assembled at the front surface side of the housing 101a in the depth direction and surrounds the peripheries of the dial plates 103 and the like to press the dial plates 103 and the like. The facing plate 105 can be a decorative material of a portion that is exposed to the front surface side in the depth direction and can come into the visual fields of the passengers including the driver in the vehicle display device 100. The facing plate 105 is configured by including a surrounding face 106 surrounding the respective display units 101 as a face opposing the viewing position and standing faces 107 provided to stand from edge portions of the surrounding face 106 along the depth direction. The surrounding face 106 is a face that has cutouts on portions corresponding to the respective display units 101 and on which the respective display units 101 are exposed through the cutouts. The standing faces 107 are faces projecting from the edge portions of the surrounding face 106 along the depth direction. That is, the surrounding face 106 is located between the light source parts 102 included in the display units 101 and the viewing position 108 of the passengers and the like in the depth direction, is formed as a face intersecting with the alignment direction of the light source parts 102 and the viewing position 108, that is, the depth direction, and in other words, is formed as a face opposing the viewing position 108 along the depth direction. On the other hand, the standing faces 107 are located between the light source parts 102 included in the display units 101 and the viewing position 108 of the passengers and the like in the depth direction and project to the driver side along the alignment direction of the light source parts 102 and the viewing position 108, that is, the depth direction. Although the four standing faces 107 in total including one at each of both of the up and down sides in the vertical direction of the surrounding face 106 along the width direction and one at each of both of the right and left sides in the width direction of the surrounding face 106 along the vertical direction are provided in this example, the number of standing faces 107 is not limited thereto.

The resin molded product 1 in the embodiment is applied to at least each of the standing faces 107 to configure the standing faces 107 by the surfaces on which the fine irregularities 2 are molded, thereby reducing reflection of light incident on the standing faces 107 from the light source parts 102 and lowering gloss of the standing faces 107. That is, in this case, the resin molded product 1 that is applied to each of the standing faces 107 is arranged at a position at which light is incident from the opposite side to the viewing position 108, in an inclined manner, on the surface on which the fine irregularities 2 are molded. Furthermore, the resin molded product 1 is also applied to the surrounding face 106 to configure the surrounding face 106 by the surface on which the fine irregularities 2 are molded, thereby reducing reflection of light incident on the surrounding face 106 as reflected light of external light or the like and lowering gloss of the surrounding face 106. That is, in this case, the resin molded product 1 that is applied to the surrounding face 106 is arranged at a position at which light is incident from the viewing position 108 side on the surface on which the fine irregularities 2 are molded.

Hereinafter, the resin molded product 1 will be described in detail.

The fine irregularities 2 are molded on the surface of the resin molded product 1 illustrated in FIG. 2 and the like such that surface roughness Sa with the fine irregularities 2 and an array pitch Pi of the fine irregularities 2 satisfy at least any of the following conditions 1 to 3.

(Condition 1)

The surface roughness Sa is equal to or larger than 1.0 μm and equal to or smaller than 10.0 μm and the array pitch Pi is equal to or larger than 3.0 μm and equal to or smaller than 18.0 μm (1.0 μm≤Sa≤10.0 μm and 3.0 μm≤Pi≤18.0 μm).

(Condition 2)

The surface roughness Sa is equal to or larger than 1.15 μm and equal to or smaller than 10.00 μm (1.15 μm≤Sa≤10.00 μm).

(Condition 3)

The array pitch Pi is equal to or larger than 3.0 μm and equal to or smaller than 14.0 μm (3.0 μm≤Pi≤14.0 μm).

The surface roughness Sa with the fine irregularities 2 is an index (parameter) indicating the depth (height) of the fine irregularities 2 and can be expressed by an index based on smoothness or the like of the surface on which the fine irregularities 2 are molded. The surface roughness Sa is arithmetic average roughness Sa. The arithmetic average roughness Sa herein is an index provided by expanding two-dimensional arithmetic average roughness Ra three-dimensionally and represents an average of absolute values of Z(x, y) in a measurement target region A (see FIG. 2). The arithmetic average roughness Sa corresponds to an arithmetic average in the measurement target region A in a state where valley portions are converted to mountain portions by absolute value processing in the drawing of three-dimensional display. The arithmetic average roughness Sa, that is, the surface roughness Sa can be expressed by the following equation (1).

$$Sa = \frac{1}{A} \int \int_A |Z(x, y)| dx dy \tag{1}$$

The surface roughness (arithmetic average roughness) Sa of the fine irregularities 2 can be measured by a previously set predetermined surface roughness measurement method. The fine irregularities 2 are molded on the surface of the resin molded product 1 such that the surface roughness Sa measured by the previously set predetermined surface roughness measurement method satisfies any one of the above-mentioned conditions 1 to 3.

As the predetermined surface roughness measurement method that is previously set for measuring the surface roughness Sa of the fine irregularities 2, as an example, a method using a "3D measuring laser microscope LEXT OLS4000 manufactured by Olympus Corporation" as a measurement device that is used for measuring the surface roughness Sa of the fine irregularities 2 is employed. In this case, in the "3D measuring laser microscope LEXT OLS4000 manufactured by Olympus Corporation", a "surface roughness analysis" function is selected as a measurement function, a "roughness parameter" is selected as an analysis parameter, and a "Gaussian filter (noise filter)" function having a cutoff frequency of 80 μm for removing a waviness component is selected as a noise removal function. In this state, an image of the surface of the resin molded product 1 is shot with a measurement magnification of 20-fold by the "3D measuring laser microscope LEXT OLS4000 manufactured by Olympus Corporation" to measure the surface roughness (arithmetic average roughness) Sa of the fine irregularities 2.

On the other hand, as the array pitch Pi of the fine irregularities 2, an average value of distances between tips of the adjacent fine irregularities 2 in the previously set measurement target region A is used (see FIG. 2). The array pitch Pi of the fine irregularities 2 can be measured by a previously set predetermined pitch measurement method. The fine irregularities 2 are molded on the surface of the resin molded product 1 such that the array pitch Pi measured by the previously set predetermined pitch measurement method satisfies any one of the above-mentioned conditions 1 to 3.

As the predetermined pitch measurement method that is previously set for measuring the array pitch Pi of the fine irregularities 2, as an example, a method using the "3D measuring laser microscope LEXT OLS4000 manufactured by Olympus Corporation" as a measurement device that is used for measuring the array pitch Pi of the fine irregularities 2 is employed, similar to the measuring of the surface roughness Sa. In this case, in the "3D measuring laser microscope LEXT OLS4000 manufactured by Olympus Corporation", a "profile measurement" function is selected as the measurement function and a "saw-like surface" function of a "one-shot filter" is selected as the noise removal function. In this state, an image of the surface of the resin molded product 1 is shot with a measurement magnification of 100-fold by the "3D measuring laser microscope LEXT OLS4000 manufactured by Olympus Corporation". Then, the array pitch Pi of the fine irregularities 2 is measured from profile data (contour data) of the surface of the resin molded product 1 that has been thus shot. FIG. 3 illustrates an example of the profile data of the surface of the resin molded product 1 that has been shot as described above. In FIG. 3, the transverse axis indicates a position of the shot surface of the resin molded product 1 in a certain direction and the longitudinal axis indicates the height of the surface at the surface position. Peaks are extracted from the profile data of the surface of the resin molded product 1 that has been shot as described above, and a distance between the adjacent peaks is measured and is set to a measured value of the array pitch Pi of the fine irregularities 2.

The peaks in the profile data are extracted, for example, in the following manner. First, a certain point on a contour line L of the surface of the resin molded product 1 indicated by the profile data is assumed to be a reference point P1. Then, peak candidate points or bottom candidate points present at one side of the reference point P1 on the contour line L in the transverse axis direction, in this example, at the right side thereof when viewed from the front side are extracted in order. The peak candidate points correspond to points at which inclination is 0 while the height is converted to be decreased from being increased and correspond to what-is-called maximum values. On the other hand, the bottom candidate points correspond to points at which inclination is 0 while the height is converted to be increased from being decreased and correspond to what-is-called minimum values. In the example of FIG. 3, a point P2 at which the inclination is 0 while the height is converted to be increased from being decreased at the right side of the reference point P1 is extracted as the bottom candidate point P2.

Subsequently, the peak candidate point present at the right side of the bottom candidate point P2 on the contour line L when viewed from the front side is extracted. In the example of FIG. 3, a point P3 at which the inclination is 0 while the height is converted to be decreased from being increased at the right side of the bottom candidate point P2 is extracted as the peak candidate point P3. Then, it is determined whether the bottom candidate point P2 can be identified as a bottom major candidate point based on an angle θ1 formed by a straight line connecting the bottom candidate point P2 and the peak candidate point P3 (the peak candidate point P3 adjacent to the bottom candidate point P2) and the transverse axis (in other words, a virtual plane for detecting the peaks). In this example, when the angle θ1 is equal to or larger than a previously set reference angle, for example, equal to or larger than 10°, the bottom candidate point P2 is identified as the bottom major candidate point. The example of FIG. 3 illustrates the case in which the angle θ1 formed by the straight line connecting the bottom candidate point P2 and the peak candidate point P3 and the transverse axis is smaller than 10°. It is therefore determined that the bottom candidate point P2 is not the bottom major candidate point.

Then, the bottom candidate point present at the right side of the peak candidate point P3 on the contour line L when viewed from the front side is extracted. In the example of FIG. 3, a point P4 at which the inclination is 0 while the height is converted to be increased from being decreased at the right side of the peak candidate point P3 is extracted as the bottom candidate point P4. Then, it is determined whether the peak candidate point P3 can be identified as a peak major candidate point based on an angle θ2 formed by a straight line connecting the peak candidate point P3 and the bottom candidate point P4 (the bottom candidate point P4 adjacent to the peak candidate point P3) and the transverse axis. In this example, when the angle θ2 is equal to or larger than a previously set reference angle, for example, equal to or larger than 10°, the peak candidate point P3 is identified as the peak major candidate point. The example of FIG. 3 illustrates the case in which the angle θ2 formed by the straight line connecting the peak candidate point P3 and the bottom candidate point P4 and the transverse axis is equal to or larger than 10°. The peak candidate point P3 is therefore identified as the peak major candidate point P3.

Subsequently, the peak candidate point present at the right side of the bottom candidate point P4 on the contour line L when viewed from the front side is extracted. In the example of FIG. 3, a point P5 at which the inclination is 0 while the height is converted to be decreased from being increased at the right side of the bottom candidate point P4 is extracted as the peak candidate point P5. Then, it is determined whether the bottom candidate point P4 can be identified as the bottom major candidate point based on an angle θ3 formed by a straight line connecting the bottom candidate point P4 and the peak candidate point P5 and the transverse axis in the same manner as described above. The example of FIG. 3 illustrates the case in which the angle θ3 formed by the straight line connecting the bottom candidate point P4 and the peak candidate point P5 and the transverse axis is equal to or larger than 10°. The bottom candidate point P4 is therefore identified as the bottom major candidate point P4.

Thereafter, the bottom candidate point present at the right side of the peak candidate point P5 on the contour line L when viewed from the front side is extracted. In the example of FIG. 3, a point P6 at which the inclination is 0 while the height is converted to be increased from being decreased at the right side of the peak candidate point P5 is extracted as the bottom candidate point P6. Then, it is determined whether the peak candidate point P5 can be identified as the peak major candidate point based on an angle θ4 formed by a straight line connecting the peak candidate point P5 and the bottom candidate point P6 and the transverse axis in the same manner as described above. The example of FIG. 3 illustrates the case in which the angle θ4 formed by the straight line connecting the peak candidate point P5 and the bottom candidate point P6 and the transverse axis is smaller than 10°. It is therefore determined that the peak candidate point P5 is not the peak major candidate point.

Subsequently, the peak candidate point present at the right side of the bottom candidate point P6 on the contour line L when viewed from the front side is extracted. In the example of FIG. 3, a point P7 at which the inclination is 0 while the height is converted to be decreased from being increased at the right side of the bottom candidate point P6 is extracted as the peak candidate point P7. Then, it is determined whether the bottom candidate point P6 can be identified as the bottom major candidate point based on an angle θ5 formed by a straight line connecting the bottom candidate point P6 and the peak candidate point P7 and the transverse axis in the same manner as described above. The example of FIG. 3 illustrates the case in which the angle θ5 formed by the straight line connecting the bottom candidate point P6 and the peak candidate point P7 and the transverse axis is equal to or larger than 10°. The bottom candidate point P6 is therefore identified as the bottom major candidate point P6.

After that, the bottom candidate point present at the right side of the peak candidate point P7 on the contour line L when viewed from the front side is extracted. In the example of FIG. 3, a point at which the inclination is 0 while the height is converted to be increased from being decreased at the right side of the peak candidate point P7 is extracted as the bottom candidate point P8. Then, it is determined whether the peak candidate point P7 can be identified as the peak major candidate point based on an angle θ6 formed by a straight line connecting the peak candidate point P7 and the bottom candidate point P8 and the transverse axis in the same manner as described above. The example of FIG. 3 illustrates the case in which the angle θ6 formed by the straight line connecting the peak candidate point P7 and the bottom candidate point P8 and the transverse axis is equal to or larger than 10°. The peak candidate point P7 is therefore identified as the peak major candidate point P7.

Thereafter, the peak candidate point present at the right side of the bottom candidate point P8 on the contour line L is extracted. In the example of FIG. 3, a point P9 at which the inclination is 0 while the height is converted to be decreased from being increased at the right side of the bottom candidate point P8 is extracted as the peak candidate point P9. Then, it is determined whether the bottom candidate point P8 can be identified as the bottom major candidate point based on an angle θ7 formed by a straight line connecting the bottom candidate point P8 and the peak candidate point P9 and the transverse axis in the same manner as described above. The example of FIG. 3 illustrates the case in which the angle θ7 formed by the straight line connecting the bottom candidate point P8 and the peak candidate point P9 and the transverse axis is equal to or larger than 10°. The bottom candidate point P8 is therefore identified as the bottom major candidate point P8.

Subsequently, the bottom candidate point present at the right side of the peak candidate point P9 on the contour line L when viewed from the front side is extracted. In the example of FIG. 3, a point P10 at which the inclination is 0 while the height is converted to be increased from being decreased at the right side of the peak candidate point P9 is extracted as the bottom candidate point P10. Then, it is determined whether the peak candidate point P9 can be identified as the peak major candidate point based on an angle θ8 formed by a straight line connecting the peak candidate point P9 and the bottom candidate point P10 and the transverse axis in the same manner as described above. The example of FIG. 3 illustrates the case in which the angle θ8 formed by the straight line connecting the peak candidate point P9 and the bottom candidate point P10 and the transverse axis is equal to or larger than 10°. The peak candidate point P9 is therefore identified as the peak major candidate point P9.

Thereafter, the peak candidate point present at the right side of the bottom candidate point P10 on the contour line L when viewed from the front side is extracted. In the example of FIG. 3, a point P11 at which the inclination is 0 while the height is converted to be decreased from being increased at the right side of the bottom candidate point P10 is extracted as the peak candidate point P11. Then, it is determined whether the bottom candidate point P10 can be identified as the bottom major candidate point based on an angle θ9 formed by a straight line connecting the bottom candidate point P10 and the peak candidate point P11 and the transverse axis in the same manner as described above. The example of FIG. 3 illustrates the case in which the angle θ9 formed by the straight line connecting the bottom candidate point P10 and the peak candidate point P11 and the transverse axis is smaller than 10°. It is therefore determined that the bottom candidate point P10 is not the bottom major candidate point.

After that, the bottom candidate point present at the right side of the peak candidate point P11 on the contour line L when viewed from the front side is extracted. In the example of FIG. 3, a point P12 at which the inclination is 0 while the height is converted to be increased from being decreased at the right side of the peak candidate point P11 is extracted as the bottom candidate point P12. Then, it is determined whether the peak candidate point P11 can be identified as the peak major candidate point based on an angle θ10 formed by a straight line connecting the peak candidate point P11 and the bottom candidate point P12 and the transverse axis in the same manner as described above. The example of FIG. 3 illustrates the case in which the angle θ10 formed by the straight line connecting the peak candidate point P11 and the bottom candidate point P12 and the transverse axis is equal to or larger than 10°. The peak candidate point P11 is therefore identified as the peak major candidate point P11.

Subsequently, the peak candidate point present at the right side of the bottom candidate point P12 on the contour line L when viewed from the front side is extracted. In the example of FIG. 3, a point P13 at which the inclination is 0 while the height is converted to be decreased from being increased at the right side of the bottom candidate point P12 is extracted as the peak candidate point P13. Then, it is determined whether the bottom candidate point P12 can be identified as the bottom major candidate point based on an angle θ11 formed by a straight line connecting the bottom candidate point P12 and the peak candidate point P13 and the transverse axis in the same manner as described above. The example of FIG. 3 illustrates the case in which the angle θ11 formed by the straight line connecting the bottom candidate point P12 and the peak candidate point P13 and the transverse axis is equal to or larger than 10°. The bottom candidate point P12 is therefore identified as the bottom major candidate point P12.

In the above-mentioned manner, the bottom major candidate points and the peak major candidate points are extracted and the highest peak major candidate point among the peak major candidate points located between the pair of bottom major candidate points is extracted as a true peak. In the example of FIG. 3, the peak major candidate point P3 is not extracted as the true peak because it is not interposed between the pair of bottom major candidate points. The peak candidate point P5 is not extracted as the true peak because although it is interposed between the pair of bottom major candidate points P4 and P6, it is not the peak major candidate point. The peak major candidate point P7 is extracted as the true peak because it is interposed between the pair of bottom major candidate points P6 and P8 and there is no other peak major candidate point in this section. The peak major candidate point P9 is extracted as the true peak and the peak major candidate point P11 is not extracted as the true peak because the peak major candidate points P9 and P11 are interposed between the pair of bottom major candidate points P8 and P12 and the peak major candidate point P9 is the highest peak major candidate point in this section.

Furthermore, a distance between the adjacent true peaks that have been extracted in the above-mentioned manner, in this example, a distance between the point P7 and the point P9 is measured and is set to the measured value of the array pitch Pi of the fine irregularities 2. In this example, the array pitches Pi between the true peaks are measured at any 10 places in the previously set measurement target region A and an average value (ten-point average) of the array pitches Pi at the 10 places is set to the measured value of the array pitch Pi of the fine irregularities 2.

The fine irregularities 2 satisfying any one of the above-mentioned conditions 1 to 3 are integrally molded without coating by transferring irregularities formed on a mold for resin molding onto the surface of the resin molded product 1 at the time of molding. As a material that is used as the resin molded product 1, for example, various synthetic resins can be used.

The resin molded product 1 in the embodiment has the surface on which the fine irregularities 2 satisfying any one of the above-mentioned conditions 1 to 3 are molded, thereby enabling the surface on which the fine irregularities 2 are molded to have a gloss value (hereinafter, referred to as an "85°-gloss value" in some cases) that is equal to or lower than 2 at an incident angle of 85°. The surface on which the fine irregularities 2 are molded typically has the 85°-gloss value of higher than 0 and equal to or lower than 2 by satisfying any one of the above-mentioned conditions 1 to 3. That is, from the other perspective, the resin molded product 1 in the embodiment has the surface on which the fine irregularities 2 having the surface roughness Sa and the array pitch Pi causing the gloss value at the incident angle of 85° to be higher than 0 and equal to or lower than 2 are molded.

The gloss value is an index indicating the degree of the gloss of the surface (to be specific, an index indicating the degree of reflection of the incident light). As the gloss, typically, definition of gloss in accordance with the JIS standard can be referred to. In this case, reflectance at a glass surface having a refractive index of 1.567 (mirror-surface reflectance of 10% at an incident angle of 60°) over the entire visible wavelength region is defined as glossiness of 100%. The gloss value can be calculated using the following equation (2) from a measurement result of luminance (candela) of light reflected at the measurement surface, for example.

Gloss value=(Measurement result of actual luminance of the measurement surface/Measurement result of luminance when the measurement surface is formed by the glass surface having the refractivity of 1.567)×100  (2)

As the gloss value is relatively higher, the reflectance of the surface is relatively higher and the surface looks relatively highly glossy. On the other hand, as the gloss value is relatively lower, the reflectance of the surface is relatively lower and the surface looks matte with relatively low gloss.

The gloss value 85°-gloss value) at the incident angle of 85° indicates the degree of the amount of light that is received by an evaluation surface located at a position inclined by 85° from the normal line direction of the measurement surface (surface of the resin molded product 1 on which the fine irregularities 2 are molded) at the opposite side to the light source at a position inclined by 85° from the normal line direction of the measurement surface after the light emitted from the light source is reflected at the measurement surface, as illustrated in FIG. 4. The 85°-gloss value can be measured by, for example, a "micro-TRI-gloss manufactured by BYK Gardner".

As the gloss value, in general, a gloss value at the incident angle of 20°, a gloss value at the incident angle of 60°, or the like other than the 85°-gloss value is used but the following advantages are provided by setting the gloss value at the incident angle of 85° as a reference. That is, in the vehicle display device 100 that is mounted on the vehicle, the incident angle, on the standing faces 107, of light that is reflected at the standing faces 107 and reaches the viewing position 108 tends to be around 85° based on a geometric arrangement relation among the light source part 102, the standing faces 107 of the facing plate 105, and the viewing position 108. For this reason, gloss evaluation in consideration of the actual view angle and the like of the driver and the like in accordance with a usage condition of the vehicle display device 100 in the vehicle can be performed by evaluating the gloss of the surface using the gloss value at the incident angle of 85° as the reference. The gloss value at the incident angle of 85° tends to vary in accordance with the surface roughness Sa, the array pitch Pi, and the like of the fine irregularities 2 in comparison with the gloss value at the incident angle of 20° and the gloss value at the incident angle of 60°. Also in view of this point, the gloss value at the incident angle of 20° and the gloss value at the incident angle of 60° can substantially satisfy required values by evaluating the gloss of the surface using the gloss value at the incident angle of 85° as the reference.

As the surface roughness Sa of the fine irregularities 2 is relatively larger, the 85°-gloss value is relatively lower and low gloss with lowered glossiness tends to be provided. As the array pitch Pi of the fine irregularities 2 is relatively smaller, the 85°-gloss value is relatively lower and low gloss with lowered glossiness tends to be provided. The above-mentioned condition 1 corresponds to a range capable of satisfying [0<85°-gloss value≤2] in a condition where the relation between the surface roughness Sa and the array pitch Pi of the fine irregularities 2 is adjusted with good balance. The above-mentioned condition 2 corresponds to a range capable of satisfying [0<85°-gloss value≤2] regardless of the array pitch Pi because the surface roughness Sa is relatively large even when the array pitch Pi is relatively large (for example, the array pitch Pi is larger than 18.0 μm and is in a range of equal to or smaller than a possible value in practice (for example, approximately 30.0 μm)). The above-mentioned condition 3 corresponds to a range capable of satisfying [0<85°-gloss value≤2] regardless of the surface roughness Sa because the array pitch Pi is relatively small even when the surface roughness Sa is relatively small (for example, the surface roughness Sa is in a range of equal to or larger than 0.3 μm and smaller than 1.0 μm).

An [upper limit value of the surface roughness Sa=10.0 μm] in the above-mentioned condition 1 and condition 2 is a value that is defined in accordance with a limit value in molding using a mold capable of being appropriately drawn out after the fine irregularities 2 having a required shape and a required dimension are molded. A [lower limit of the array pitch Pi=3.0 μm] in the above-mentioned condition 1 and condition 3 is a value that is defined in accordance with a limit value in manufacturing of the mold itself for molding the fine irregularities 2 with the required shape and the required dimension.

The resin molded product 1, more preferably, satisfies the following conditions 1' to 3' that further restrict the above-mentioned conditions 1 to 3, respectively.
(Condition 1')
The surface roughness Sa is equal to or larger than 1.0 μm and equal to or smaller than 10.0 μm and the array pitch Pi is equal to or larger than 3.0 μm and equal to or smaller than 17.5 μm (1.0 μm≤Sa≤10.0 μm and 3.0 μm≤Pi≤17.5 μm).
(Condition 2')
The surface roughness Sa is equal to or larger than 1.3 μm and equal to or smaller than 10.0 μm (1.3 μm≤Sa≤10.0 μm).
(Condition 3')
The array pitch Pi is equal to or larger than 3.0 μm and equal to or smaller than 13.5 μm (3.0 μm≤Pi≤13.5 μm).

The above-mentioned condition 1' corresponds to a range capable of satisfying [0<85°-gloss value≤2] in a condition where the relation between the surface roughness Sa and the array pitch Pi of the fine irregularities 2 is adjusted with better balance. The above-mentioned condition 2' corresponds to a range capable of satisfying [0<85°-gloss value≤2] without fail regardless of the array pitch Pi because the surface roughness Sa is relatively large even when the array pitch Pi is relatively large (for example, the array pitch Pi is larger than 17.5 μm and is in a range of equal to or smaller than a possible value in practice (for example, approximately 30.0 μm)). The above-mentioned condition 3' corresponds to a range capable of satisfying [0<85°-gloss value≤2] without fail regardless of the surface roughness Sa because the array pitch Pi is relatively small even when the surface roughness Sa is relatively small (for example, the surface roughness Sa is equal to or larger than 0.3 μm and smaller than 1.0 μm).

Moreover, the resin molded product 1, most preferably, satisfies the following condition 1" that further restricts the above-mentioned condition 1 among the above-mentioned conditions 1 to 3.
(Condition 1")
The surface roughness Sa is equal to or larger than 1.3 μm and equal to or smaller than 10.0 μm and the array pitch Pi is equal to or larger than 3.0 μm and equal to or smaller than 13.5 μm (1.3 μm≤Sa≤10.0 μm and 3.0 μm≤Pi≤13.5 μm).

With this condition, the surface of the resin molded product 1 on which the fine irregularities 2 are molded can be made to have the 85°-gloss value of higher than 0 and equal to or lower than 2 most preferably.

FIG. 5 represents measurement results of influence by the surface roughness Sa and the array pitch Pi of the fine irregularities on the 85°-gloss value. In FIG. 5, the transverse axis indicates the surface roughness Sa (μm) and the array pitch Pi (μm) and the longitudinal axis indicates the 85°-gloss value Gs [85]. The measurement results indicate measured values of the 85°-gloss value of the surface on which the fine irregularities are actually molded with predetermined surface roughnesses Sa and predetermined array pitches Pi. In measurement of the 85°-gloss value, as illustrated in FIG. 4, the light source is configured by a light emitting diode (LED), the measurement surface on which the fine irregularities are provided is made to be equivalent to a rectangular surface of 1 mm×1 mm that is formed with black polypropylene, the evaluation surface is formed as a rectangular surface of 3 mm×6 mm, and an interval between the light source and the measurement surface and an interval between the measurement surface and the evaluation surface are set to 5 mm. The surface roughness Sa, the array pitch Pi, and the 85°-gloss value Gs are measured in the above-mentioned manner using the "3D measuring laser microscope LEXT OLS4000 manufactured by Olympus Corporation" and the "micro-TRI-gloss manufactured by BYK Gardner". The surface roughness Sa and the array pitch Pi are measured using the above-mentioned pitch measurement method and surface roughness measurement method. In FIG. 5, bars A1 to A7 indicate the 85°-gloss values of resin molded products without coating according to comparative examples in which a plurality of fine irregularities departing from the ranges of the above-mentioned conditions 1 to 3 are integrally molded on surfaces. In FIG. 5, bars B1 to B5 indicate the 85°-gloss values of resin molded products according to comparative examples in which a plurality of fine irregularities are formed on surfaces by applying coating.

As is seen from the measurement results indicated by the bars A1 to A7 in FIG. 5, in the resin molded products without coating in which the fine irregularities having the surface roughnesses Sa and the array pitches Pi departing from the ranges of the above-mentioned conditions 1 to 3 are integrally molded, it is obvious that the 85°-gloss values of the surfaces on which the fine irregularities are molded are larger than 2. On the other hand, as is also seen from the measurement results indicated by the bars B1 to B5 in FIG. 5, in the resin molded products having the coated surfaces, it is obvious that the 85°-gloss values of the coated surfaces are higher than 0 and equal to or lower than 2.

In consideration of the above-mentioned measurement results, in the resin molded product 1 in the embodiment, the ranges of the above-mentioned conditions 1 to 3 related to the fine irregularities 2 are set based on simulation results illustrated in FIG. 6 and FIG. 8, which will be described later, in order to provide the fine irregularities 2 having the 85°-gloss value equivalent to those of the resin molded products having the coated surfaces indicated by the bars B1 to B5 in FIG. 5, that is, the 85°-gloss value of higher than 0 and equal to or lower than 2.

FIG. 6 illustrates a first simulation result of the influence by the surface roughness Sa and the array pitch Pi of the fine irregularities 2 on the 85°-gloss value. In FIG. 6, the transverse axis indicates the surface roughness Sa (μm) and the array pitch Pi (μm) and the longitudinal axis indicates the 85°-gloss value Gs [85]. In the first simulation, the fine irregularities 2 are assumed to be hemispherical bodies as illustrated in FIG. 7, the height of the hemispherical bodies is assumed to be the surface roughness Sa, and a distance between the tips (peaks) of the adjacent hemispherical bodies is assumed to be the array pitch Pi. In this simulation, like the above-mentioned measurement results, the light source is configured by the LED, the measurement surface on which the fine irregularities are molded is made to be equivalent to the rectangular surface of 1 mm×1 mm that is formed with black polypropylene, the evaluation surface is formed as the rectangular surface of 3 mm×6 mm, and the interval between the light source and the measurement surface and the interval between the measurement surface and the evaluation surface are set to 5 mm. In the simulation, the surface roughness Sa and the array pitch Pi are made to vary at predetermined variation widths and the 85°-gloss value Gs [85] is calculated for each combination of the surface roughness Sa and the array pitch Pi. As described above with reference to FIG. 4, the 85°-gloss value Gs [85] is calculated in the following manner. That is, the luminance (candela) of the light that is received by the evaluation surface located at the position inclined by 85° from the normal line direction of the measurement surface at the opposite side to the light source at the position inclined by 85° from the normal line direction of the measurement surface after the light emitted from the light source is reflected at the measurement surface is calculated using various well-known relational equations and the 85°-gloss value Gs [85] is calculated based on the luminance (candela) using the equation (2).

As is also seen from the simulation result illustrated in FIG. 6, it is obvious that the surface on which the fine irregularities 2 are molded can be made to have the 85°-gloss value of higher than 0 and equal to or lower than 2 when the surface roughness Sa and the array pitch Pi of the fine irregularities 2 satisfy any one of the following conditions 1-1 to 3-1. To be more specific, it is obvious that as the surface roughness Sa of the fine irregularities 2 is relatively larger, the 85°-gloss value tends to be relatively lower and as the array pitch Pi of the fine irregularities 2 is relatively smaller, the 85°-gloss value tends to be relatively lower.
(Condition 1-1)

The surface roughness Sa is equal to or larger than 1.0 μm and equal to or smaller than 10.0 μm and the array pitch Pi is equal to or larger than 3.0 μm and equal to or smaller than 18.0 μm (1.0 μm≤Sa≤10.0 μm and 3.0 μm≤Pi≤18.0 μm).
(Condition 2-1)

The surface roughness Sa is equal to or larger than 1.3 μm and equal to or smaller than 10.0 μm (1.3 μm≤Sa≤10.0 μm).
(Condition 3-1)

The array pitch Pi is equal to or larger than 3.0 μm and equal to or smaller than 13.5 μm (3.0 μm≤Pi≤13.5 μm).

The above-mentioned condition 1-1 corresponds to a range capable of satisfying [0<85°-gloss value≤2] in a condition where the relation between the surface roughness Sa and the array pitch Pi of the fine irregularities 2 is adjusted with good balance in the case where the fine irregularities 2 are the hemispherical bodies. The above-mentioned condition 2-1 corresponds to a range capable of satisfying [0<85°-gloss value≤2] regardless of the array pitch Pi because the surface roughness Sa is relatively large even when the array pitch Pi is relatively large (for example, the array pitch Pi is larger than 18.0 μm and is in a range of equal to or smaller than a possible value in practice (for example, approximately 30.0 μm)) in the case where the fine irregularities 2 are the hemispherical bodies. The above-mentioned condition 3-1 corresponds to a range capable of satisfying [0<85°-gloss value≤2] regardless of the surface roughness Sa because the array pitch Pi is relatively small even when the surface roughness Sa is relatively small (for example, the surface roughness Sa is equal to or larger than 0.3 μm and smaller than 1.0 μm) in the case where the fine irregularities 2 are the hemispherical bodies. It should be noted that in the case where the fine irregularities 2 are the hemispherical bodies, a range capable of satisfying [0<85°-gloss value≤2] in the condition where the relation between the surface roughness Sa and the array pitch Pi of the fine irregularities 2 is adjusted with good balance is, more preferably, a range of the following condition 1-1".
(Condition 1-1")

The surface roughness Sa is equal to or larger than 1.3 μm and equal to or smaller than 10.0 μm and the array pitch Pi is equal to or larger than 3.0 μm and equal to or smaller than 13.5 μm (1.3 μm≤Sa≤10.0 μm and 3.0 μm≤Pi≤13.5 μm).

FIG. 8 illustrates a second simulation result of the influence by the surface roughness Sa and the array pitch Pi of the fine irregularities 2 on the 85°-gloss value. In FIG. 8, the transverse axis indicates the surface roughness Sa (μm) and the array pitch Pi (μm) and the longitudinal axis indicates the 85°-gloss value Gs [85]. In the second simulation, the fine irregularities 2 are assumed to be conical bodies as illustrated in FIG. 9, the height of the conical bodies is assumed to be the surface roughness Sa, and a distance between the tips (peaks) of the adjacent conical bodies is assumed to be the array pitch Pi. Other simulation conditions are the same as those in the above-mentioned first simulation.

As is also seen from the simulation result illustrated in FIG. 8, it is obvious that the surface on which the fine irregularities 2 are molded can be made to have the 85°-gloss value of higher than 0 and equal to or lower than 2 when the surface roughness Sa and the array pitch Pi of the fine irregularities 2 satisfy the following conditions 1-2 to 3-2. To be more specific, it is obvious that as the surface roughness Sa of the fine irregularities 2 is relatively larger, the 85°-gloss value tends to be relatively lower and as the array pitch Pi of the fine irregularities 2 is relatively smaller, the 85°-gloss value tends to be relatively lower.
(Condition 1-2)

The surface roughness Sa is equal to or larger than 1.0 μm and equal to or smaller than 10.0 μm and the array pitch Pi is equal to or larger than 3.0 μm and equal to or smaller than 17.5 μm (1.0 μm≤Sa≤10.0 μm and 3.0 μm≤Pi≤17.5 μm).
(Condition 2-2)

The surface roughness Sa is equal to or larger than 1.15 μm and equal to or smaller than 10.00 μm (1.15 μm≤Sa≤10.00 μm).
(Condition 3-2)

The array pitch Pi is equal to or larger than 3.0 μm and equal to or smaller than 14.0 μm (3.0 μm≤Pi≤14.0 μm).

The above-mentioned condition 1-2 corresponds to a range capable of satisfying [0<85°-gloss value≤2] in a condition where the relation between the surface roughness Sa and the array pitch Pi of the fine irregularities 2 is adjusted with good balance in the case where the fine irregularities 2 are the conical bodies. The above-mentioned condition 2-2 corresponds to a range capable of satisfying [0<85°-gloss value≤2] regardless of the array pitch Pi because the surface roughness Sa is relatively large even when the array pitch Pi is relatively large (for example, the array pitch Pi is larger than 17.5 μm and is in a range of equal to or smaller than a possible value in practice (for example, approximately 30.0 μm)) in the case where the fine irregularities 2 are the conical bodies. The above-mentioned condition 3-2 corresponds to a range capable of satisfying [0<85°-gloss value≤2] regardless of the surface roughness Sa because the array pitch Pi is relatively small even when the surface roughness Sa is relatively small (for example, the surface roughness Sa is equal to or larger than 0.60 μm and smaller than 1.15 μm) in the case where the fine irregularities 2 are the conical bodies. It should be noted that in the case where the fine irregularities 2 are the conical bodies, a range capable of satisfying [0<85°-gloss value≤2] in the condition where the relation between the surface roughness Sa and the array pitch Pi of the fine irregularities 2 is adjusted with good balance is, more preferably, a range of the following condition 1-2".
(Condition 1-2")

The surface roughness Sa is equal to or larger than 1.15 μm and equal to or smaller than 10.00 μm and the array pitch Pi is equal to or larger than 3.0 μm and equal to or smaller than 14.0 μm (1.15 μm≤Sa≤10.00 μm and 3.0 μm≤Pi≤14.0 μm).

The above-mentioned condition 1 is set to a range satisfying any one of the condition 1-1 when the fine irregularities 2 are the hemispherical bodies and the condition 1-2 when the fine irregularities 2 are the conical bodies. In the same manner, the above-mentioned condition 2 is set to a range satisfying any one of the condition 2-1 when the fine irregularities 2 are the hemispherical bodies and the condition 2-2 when the fine irregularities 2 are the conical bodies. The above-mentioned condition 3 is set to a range satisfying any one of the condition 3-1 when the fine irregularities 2 are the hemispherical bodies and the condition 3-2 when the fine irregularities 2 are the conical bodies. Furthermore, the above-mentioned condition 1' is set to a range satisfying both of the condition 1-1 when the fine irregularities 2 are the hemispherical bodies and the condition 1-2 when the fine irregularities 2 are the conical bodies. In the same manner, the above-mentioned condition 2' is set to a range satisfying both of the condition 2-1 when the fine irregularities 2 are the hemispherical bodies and the condition 2-2 when the fine irregularities 2 are the conical bodies. The above-mentioned condition 3' is set to a range satisfying both of the condition 3-1 when the fine irregularities 2 are the hemispherical bodies and the condition 3-2 when the fine irregularities 2 are the conical bodies. The above-mentioned condition 1" is set to a range satisfying both of the condition 1-1" when the fine irregularities 2 are the hemispherical bodies and the condition 1-2" when the fine irregularities 2 are the conical bodies.

FIG. 10 illustrates measurement results of the influence by the surface roughness Sa and the array pitch Pi of the fine irregularities 2 on the 85°-gloss value. In FIG. 10, the transverse axis indicates the array pitch Pi (μm) and the longitudinal axis indicates the surface roughness Sa (μm). The measurement results indicate measured values of the 85°-gloss values of the surfaces on which the fine irregularities 2 are actually molded with predetermined surface roughnesses Sa and predetermined array pitches Pi without coating. In the same manner as the above-mentioned simulations, the light source is configured by the LED, the measurement surface on which the fine irregularities 2 are molded is formed as the rectangular surface of 1 mm×1 mm that is actually molded with an ABS resin, the evaluation surface is formed as the rectangular surface of 3 mm×6 mm, and the interval between the light source and the measurement surface and the interval between the measurement surface and the evaluation surface are set to 5 mm. The surface roughness Sa, the array pitch Pi, and the 85°-gloss value Gs are measured in the above-mentioned manner using the "3D measuring laser microscope LEXT OLS4000 manufactured by Olympus Corporation" and the "micro-TRI-gloss manufactured by BYK Gardner". The surface roughness Sa and the array pitch Pi are measured using the above-mentioned pitch measurement method and surface roughness measurement method.

As is also seen from the measurement results in FIG. 10, it is obvious that the surface on which the fine irregularities 2 are molded can be made to have the 85°-gloss value of higher than 0 and equal to or lower than 2 when the surface roughness Sa and the array pitch Pi of the fine irregularities 2 satisfy any one of the above-mentioned conditions 1 to 3. That is it is obvious that the measurement results provide substantially the same tendency of the measured values of the 85°-gloss value in accordance with the surface roughness Sa and the array pitch Pi of the fine irregularities 2 as those in the simulation results, thereby supporting validity of the simulation results. The 85°-gloss values of implementation products within a range T1 illustrated in FIG. 10 are approximately 0.5, the 85°-gloss values of implementation products within a range T2 are approximately 0.7 to 0.8, the 85°-gloss values of implementation products within a range T3 are approximately 1.0, and the 85°-gloss values of implementation products within a range T4 are approximately 1.1. That is, it is obvious that the gloss value, at the incident angle of 85°, of the implementation product of the resin molded product 1 having the surface on which the fine irregularities 2 having at least the surface roughness Sa of equal to or larger than 1.4 μm and equal to or smaller than 3.0 μm and the array pitch Pi of equal to or larger than 4.0 μm and equal to or smaller than 13.0 μm are molded is equal to or lower than 2.

The resin molded product 1 as described above has the surface on which the fine irregularities 2 having the surface roughness Sa of equal to or larger than 1.0 μm and equal to or smaller than 10.0 μm and the array pitch Pi of equal to or larger than 3.0 μm and equal to or smaller than 18.0 μm are molded.

The resin molded product 1 as described above has the surface on which the fine irregularities 2 causing the gloss value at the incident angle of 85° to be equal to or lower than 2 are molded. The resin molded product 1 is arranged at a position at which light is incident on the surface on which the fine irregularities 2 are molded from the opposite side to the viewing position 108.

The vehicle display device 100 as described above includes the display units 101 that are mounted on the vehicle and display pieces of information related to the vehicle and the resin molded product 1 that is provided around the display units 101 and has the surface on which the fine irregularities 2 having the surface roughness of equal to or larger than 1.0 μm and equal to or smaller than 10.0 μm and the array pitch Pi of equal to or larger than 3.0 μm and equal to or smaller than 18.0 μm are molded.

In other words, the vehicle display device 100 as described above includes the display units 101 that are mounted on the vehicle and display the pieces of information related to the vehicle and the resin molded product 1 that is provided around the display units 101 and has the surface on which the fine irregularities 2 causing the gloss value at the incident angle of 85° to be equal to or lower than 2 are molded.

Accordingly, the resin molded product 1 and the vehicle display device 100 can scatter the incident light on the surface with the fine irregularities 2 molded on the surface, thereby lowering the gloss of the surface. As a result, the resin molded product 1 and the vehicle display device 100 can lower the gloss of the surface in the visual field regions of the passengers including the driver in the vehicle, thereby reducing plastic feeling that tends to provide cheap image and providing high-grade feeling in appearance. The resin molded product 1 and the vehicle display device 100 can lower the gloss of the surface and provide a matte effect with the fine irregularities 2 molded on the surface even without coating using no coating or the like equivalently to a resin molded product with coating. As a result, the resin molded product 1 and the vehicle display device 100 can, for example, reduce worker-hours at the time of manufacturing in comparison with the case with coating, thereby reducing the manufacturing cost.

Furthermore, with the resin molded product 1 and the vehicle display device 100 as described above, the resin molded product 1 is arranged at the position at which light is incident on the surface on which the fine irregularities 2 are molded from the opposite side to the viewing position 108. Accordingly, the resin molded product 1 and the vehicle display device 100 can reduce reflection of light that is incident on the surface on which the fine irregularities 2 are molded from the opposite side to the viewing position 108, thereby lowering the gloss.

In addition, with the resin molded products 1 and the vehicle display device 100 as described above, it is preferable that the fine irregularities 2 have the surface roughness of equal to or larger than 1.3 μm and equal to or smaller than 10.0 μm and the array pitch Pi of equal to or larger than 3.0 μm and equal to or smaller than 13.5 μm. In this case, in the resin molded product 1 and the vehicle display device 100, the surface on which the fine irregularities 2 are molded can be made to have the 85°-gloss value of equal to or lower than 2 more reliably.

With the resin molded product 1 and the vehicle display device 100 as described above, the surface of the resin molded product 1 on which the fine irregularities 2 are molded is located between the light source parts 102 included in the display units 101 mounted on the vehicle and displaying the pieces of information related to the vehicle and the viewing position 108, and the resin molded product 1 configures the standing faces 107 projecting along the alignment direction of the light source parts 102 and the viewing position 108. That is, the vehicle display device 100 includes the display units 101 that are mounted on the vehicle and display the pieces of information related to the vehicle and the resin molded product 1 that is located between the light source parts 102 included in the display units 101 and the viewing position 108, is provided on the standing faces 107 projecting along the alignment direction of the light source parts 102 and the viewing position 108, and has the surface on which the fine irregularities 2 causing the gloss value at the incident angle of 85° to be equal to or lower than 2 are molded. The fine irregularities 2 have the surface roughness of equal to or larger than 1.0 μm and equal to or smaller than 10.0 μm and the array pitch Pi of equal to or larger than 3.0 μm and equal to or smaller than 18.0 μm, have the surface roughness of equal to or larger than 1.15 μm and equal to or smaller than 10.00 μm, or have the array pitch Pi of equal to or larger than 3.0 μm and equal to or smaller than 14.0 μm. To be more specific, the fine irregularities 2 preferably have the surface roughness of equal to or larger than 1.4 μm and equal to or smaller than 3.0 μm and the array pitch Pi of equal to or larger than 4.0 μm and equal to or smaller than 13.0 μm. Accordingly, the resin molded product 1 and the vehicle display device 100 can, for example, configure the standing faces 107 forming the facing plate 105 of the vehicle display device 100 as no-coated low-reflection facings. With this configuration, the resin molded product 1 and the vehicle display device 100 can reduce light that is incident on the standing faces 107 from the light source parts 102 and is reflected to the side of the viewing position 108 of the passengers including the driver, thereby lowering the gloss of the standing faces 107.

The resin molded product and the vehicle display device according to the above-mentioned embodiment of the present invention are not limited to those in the above-mentioned embodiment and various changes can be made in a range described in the appended claims.

Although the resin molded product 1 is applied to the surrounding face 106 and the standing faces 107 configuring the facing plate 105 of the vehicle display device 100 in the above-mentioned description, the resin molded product 1 is not limited to being applied to them and may be applied to other portions of the vehicle or portions of a product other than the vehicle. The resin molded product 1 may be applied to other portions that are exposed to the front surface side in the depth direction and can come into the visual fields of the passengers including the driver in the vehicle display device 100, such as the pointers 104 and pointer caps that are molded with resin and the instrument panel. Alternatively, the resin molded product 1 may be applied to a portion on which gloss of a surface with reflection of external light or the like is desired to be lowered, for example, a housing inner wall surface of a head-up display. Furthermore, the resin molded product 1 may be applied to a portion (for example, a frame-like portion surrounding end portions of a display surface of a display) on which gloss of a surface is desired to be lowered in housings of game machines, portable terminal devices, home electric appliances, and the like as the portions of a product other than the vehicle.

Although the display units 101 are analog instruments displaying various measured values related to the vehicle in an analog manner with the pointers 104 as solid objects in the above description, the display units 101 are not limited thereto. A vehicle display device 100A according to a modification illustrated in FIG. 11 includes a display unit 101A instead of the display units 101 (see FIG. 1). The display unit 101A displays various images on an image display surface as pieces of information related to the vehicle and is configured by a thin display. The display unit 101A has a light source part 102A configuring a what-is-called backlight and displays various pieces of image information related to the vehicle using light that is emitted from the light source part 102A. Although as the display unit 101A, for example, a thin-film transistor (TFT) liquid crystal display can be used, the display unit 101A is not limited thereto and a plasma display, an organic electroluminescent (EL) display, or the like can be also used. The display unit 101A may display, as the pieces of information related to the vehicle, various pieces of driving information related to driving that vary from hour to hour in the driving of the vehicle, such as information related to environmentally friendly traveling, a cumulative travel distance, a cooling water temperature, a fuel remaining amount, and a battery power storage amount, in addition to the pointers 104, the index portions, and the images corresponding to the patterns or the like for the warning display as mentioned above. The surrounding face 106 of the facing plate 105 is provided so as to surround the periphery of the image display surface of the display unit 101A.

The resin molded product 1 may be applied to the surrounding face 106 and the standing faces 107 of the facing plate 105 in the vehicle display device 100A incorporating therein the above-mentioned display unit 101A. With this application, the resin molded product 1 can reduce light reflection and lower the gloss on the surrounding face 106 and the standing faces 107 of the facing plate 105 in the vehicle display device 100A. In this case, the resin molded product 1 can preferably reduce reflection, in particular, on the standing faces 107 and the like, of light emitted from the light source part 102A of a display configuring the display unit 101A that has a relatively large amount of output light in comparison with the light source parts 102 (see FIG. 1) as the analog instruments, thereby providing an effect of lowering the gloss more significantly. For example, reflection and the like of an image that is displayed on the display unit 101A onto the standing faces 107 can be also reduced.

The above-mentioned surface on which the fine irregularities 2 are molded is configured as the surface having the 85°-gloss value of higher than 0 and equal to or lower than 2 by molding the fine irregularities 2 such that the surface roughness Sa with the fine irregularities 2 and the array pitch Pi of the fine irregularities 2 satisfy any one of the above-mentioned conditions 1 to 3. That is, the surface on which the fine irregularities 2 are molded is configured as the surface having the 85°-gloss value of higher than 0 and equal to or lower than 2 by adjusting the surface roughness Sa with the fine irregularities 2 or the array pitch Pi of the fine irregularities 2. The embodiment is not however limited thereto and the surface on which the fine irregularities 2 are molded may be configured as the surface having the 85°-gloss value of higher than 0 and equal to or lower than 2 by adjusting other parameters related to the shape of the fine irregularities 2. The surface on which the fine irregularities 2 are molded may be configured as the surface having the 85°-gloss value of higher than 0 and equal to or lower than 2 by, for example, adjusting the depth of the fine irregularities 2 and the array pitch of the fine irregularities 2. Alternatively, the surface on which the fine irregularities 2 are molded may be configured as the surface having the 85°-gloss value of higher than 0 and equal to or lower than 2 by, for example, adjusting a structure adjacent angle formed by peripheral wall surfaces of the adjacent fine irregularities 2. Furthermore, the surface on which the fine irregularities 2 are molded may be configured as the surface having the 85°-gloss value of higher than 0 and equal to or lower than 2 by, for example, providing pin holes on tips of convex portions of the fine irregularities 2 and adjusting an average diameter and an average depth of the pin holes. The surface on which the fine irregularities 2 are molded may be configured as the surface having the 85°-gloss value of higher than 0 and equal to or lower than 2 by, for example, further providing fine projections on the convex portions of the fine irregularities 2 and adjusting a bottom diameter and an array pitch of the fine projections. Moreover, the surface on which the fine irregularities 2 are molded may be configured as the surface having the 85°-gloss value of higher than 0 and equal to or lower than 2 by, for example, forming the fine irregularities 2 by truncated pyramid-shaped fine convex portions or the like and adjusting a diameter of circles circumscribed on bottom polygonal shapes of the truncated pyramid-shaped fine convex portions and an array pitch thereof. That is, from the other perspective, the resin molded product 1 in the embodiment may have the surface on which the fine irregularities 2 having the depth, the array pitch, the structure adjacent angle, the average diameter and the average depth of the pin holes formed on the tips of the convex portions, the bottom surface diameter and the pitch of the fine projections formed on the convex portions, the diameter of the circles circumscribed on the bottom polygonal shapes of the truncated pyramid-shaped fine convex portions and the array pitch thereof, or the like causing the gloss value at the incident angle of 85 to be higher than 0 and equal to or lower than 2 are molded.

Although the "3D measuring laser microscope LEXT OLS4000 manufactured by Olympus Corporation" is used as the measurement device for measuring the surface roughness Sa and the array pitch Pi of the fine irregularities 2 in the above description, the measurement device is not limited thereto and another measurement device may be used. In this case, a predetermined surface roughness measurement method and a predetermined pitch measurement method that are previously set for measuring the surface roughness Sa and the array pitch Pi of the fine irregularities 2 may be equivalent to those in the above description.

A resin molded product and a vehicle display device according to the embodiment provide an effect that gloss of a surface can be lowered because a plurality of fine irregularities molded on the surface can scatter incident light on the surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a display unit that is mounted on a vehicle and displays information relating to the vehicle;
a surrounding face that surrounds the display unit as a face opposing a viewing position for viewing the display unit; and
a resin molded product that is located between a light source part included in the display unit and the viewing position, wherein
the resin molded product is provided on a standing face projecting from an edge portion of the surrounding face along an alignment direction of the light source part and the viewing position,
the resin molded product comprises a surface of the resin molded product on which a plurality of fine irregularities are molded, the fine irregularities having a surface roughness of equal to or larger than 1.0 μm and equal to or smaller than 10.0 μm, and an array pitch of equal to or larger than 3.0 μm and equal to or smaller than 18.0 μm,
the standing face is inclined between the light source part and the viewing position and is configured to reduce reflection of light incident on the standing face from the light source part so as to lower gloss of the standing face, and
four standing faces, including the standing face, in total are provided and include one at each of both of up and down sides in a vertical direction of the surrounding face along a width direction and one at each of both of right and left sides in the width direction of the surrounding face along the vertical direction.

2. A vehicle display device comprising:
a display unit that is mounted on a vehicle and displays information relating to the vehicle;
a surrounding face that surrounds the display unit as a face opposing a viewing position for viewing the display unit; and
a resin molded product that is located between a light source part included in the display unit and the viewing position,
wherein the resin molded product is provided on a standing face projecting from an edge portion of the surrounding face along an alignment direction of the light source part and the viewing position, wherein the resin molded product has a surface on which a plurality of fine irregularities causing a gloss value at an incident angle of 85° to be equal to or lower than 2 are molded, wherein the resin molded product comprises a surface of the resin molded product on which a plurality of fine irregularities are molded, the fine irregularities having a surface roughness of equal to or larger than 1.0 μm and equal to or smaller than 10.0 μm, and an array pitch of equal to or larger than 3.0 μm and equal to or smaller than 18.0 μm, or a surface roughness of equal to or larger than 1.15 μm and equal to or smaller than 10.00 μm, and an array pitch of equal to or larger than 3.0 μm and equal to or smaller than 14.0 μm, wherein the standing face is inclined between the light source part and the viewing position and is configured to reduce reflection of light incident on the standing face from the light source part so as to lower gloss of the standing face, and four standing faces, including the standing face, in total are provided and include one at each of both of up and down sides in a vertical direction of the surrounding face along a width direction and one at each of both of right and left sides in the width direction of the surrounding face along the vertical direction..

3. The vehicle display device according to claim 2, wherein
the fine irregularities have a surface roughness of equal to or larger than 1.4 μm and equal to or smaller than 3.0 μm, and an array pitch of equal to or larger than 4.0 μm and equal to or smaller than 13.0 μm.

4. The vehicle display device according to claim 1,
wherein the resin molded product comprises a plurality of dial plates, and
wherein the standing face is separated from the dial plates in a direction from the light source part and the viewing position, and
wherein the standing face comprises a greater surface area than surface areas of the dial plates facing the viewing position.

* * * * *